United States Patent [19]
Sharp

[11] Patent Number: 5,449,203
[45] Date of Patent: * Sep. 12, 1995

[54] FITTINGS FOR CONNECTION TO DOUBLE WALL PIPELINE SYSTEMS

[76] Inventor: Bruce R. Sharp, 1741 Hawaii Ct., Marco Island, Fla. 33937

[ * ] Notice: The portion of the term of this patent subsequent to Nov. 9, 2010 has been disclaimed.

[21] Appl. No.: 150,365

[22] Filed: Nov. 9, 1993

Related U.S. Application Data

[63] Continuation-in-part of Ser. No. 876,505, Apr. 30, 1992, Pat. No. 5,259,651, which is a continuation-in-part of Ser. No. 680,513, Apr. 4, 1991, abandoned.

[51] Int. Cl.$^6$ .............................................. F16L 9/18
[52] U.S. Cl. ................. 285/133.1; 285/156; 285/138; 285/245
[58] Field of Search ................ 285/133.1, 138, 156, 285/343, 245; 138/114, 148

[56] References Cited

U.S. PATENT DOCUMENTS

| | | | |
|---|---|---|---|
| 2,956,586 | 10/1960 | Zeigler et al. | 285/133.1 |
| 3,980,112 | 9/1976 | Basham | 285/133.1 |
| 4,122,968 | 10/1978 | Germain | 138/114 |
| 4,149,568 | 4/1979 | Kuntz et al. | 138/114 |
| 4,274,549 | 6/1981 | Germain | 138/114 |
| 4,871,196 | 10/1989 | Kingsford | 285/138 |
| 4,886,305 | 12/1989 | Martin | 285/133.1 |
| 4,922,971 | 5/1990 | Grantham | 285/133.1 |

Primary Examiner—Eric K. Nicholson
Attorney, Agent, or Firm—Charles R. Wilson

[57] ABSTRACT

A double wall compression fitting is dimensioned for attachment to a double wall pipeline system having an inner pipeline and an outer pipeline. The fitting is comprised of an inner housing having at least two terminals, an outer housing encasing the inner housing in a manner to form an annular space therebetween and a compression connecting assembly. The compression connecting assembly connects the inner and outer housings to the double wall pipeline system so that the annular space between the housings is in communication with an annular space between the pipelines of the double wall pipeline system. The compression connecting assembly includes a coupler with means to compress it to form a compression seal with the outer pipeline, and a substantially non-compressible spacer with communication means.

21 Claims, 3 Drawing Sheets

FITTINGS FOR CONNECTION TO DOUBLE WALL PIPELINE SYSTEMS

This is a continuation-in-part of Ser. No. 07/876,505, filed Apr. 30, 1992, "Double Wall Fitting For Use With Double Wall Pipeline Systems, now U.S. Pat. No. 5,259,651, which is a continuation-in-part of Ser. No. 07/680,513, filed Apr. 4, 1991, "Double Wall Fittings For Use With Double Wall Pipeline Systems", now abandoned This invention relate to fittings for use on pipeline systems for conveying liquids. More particularly, the invention relates to double walled fittings for use on double wall pipeline systems.

BACKGROUND OF THE INVENTION

Pipelines are used extensively for conveying liquids. One area where pipelines are used is in the transporting of liquid from bulk storage tanks. Many types of liquids are stored in bulk, both above ground and underground. A special problem exists with leaks in the pipelines used in connection with underground storage tanks. If the liquid being conveyed is a danger to the environment or the health when not controlled, substantial damage can occur before the leak is even detected. A good example of this are the pipelines used to convey liquid gasoline at retail gasoline service stations. Necessarily, these stations are in populated areas and therefore there is always a danger associated with leaks from the tanks or pipelines associated therewith.

Leaked gasoline poses a hazard to the environment as well as an obvious health hazard. Any leak which develops is normally very slow initially. This means that the leak is difficult to detect until a substantial amount of gasoline has leaked. By that time environmental damage and possible health problems have occurred.

Various attempts have been made to alleviate the problems associated with underground pipelines, including use of double walled pipeline systems. In this type of system, an outer pipeline wall acts as a containment vessel if an inner pipeline wall develops a leak. A slow leak in the pipeline is satisfactorily contained. However, installation of known double walled pipelines is difficult. Initially there can be a problem of getting the inner pipeline inside of the outer pipeline. This is especially true for long lengths of pipelines wherein the inner pipeline is flexible. Even a semi-rigid inner pipeline is difficult to work with due to the fact it is normally wound on a reel in manufacturing. The curved nature of the pipeline stored and shipped in this manner tends to persist.

Another problem experienced with double wall pipeline systems is the need for special fittings normally needed with any pipeline system. Straight fittings, elbows and T-fittings are often used in connecting a pipeline terminal to another pipeline terminal, dispenser, etc. Known fittings used on conventional single wall pipelines are not able to maintain a segregation of the inner pipeline flow channel from the outer pipeline flow channel. The lack of reliable easy to use fittings for use on double wall pipeline systems has reduced the attractiveness of such systems.

There has now been developed double wall fittings for double wall pipeline systems. The fittings solve many of the problems inherent with the existing fitting systems. The fittings of this invention are economical and provide a means of connecting not available previously.

SUMMARY OF THE INVENTION

A double wall fitting is dimensioned for attachment to a double wall pipeline system having an inner pipeline and an outer pipeline. The fitting is comprised of an inner housing having at least two terminals, an outer housing encasing the inner housing in a manner to form an annular space therebetween and a compression connecting assembly. The connecting assembly is capable of connecting the inner and outer housings to the double wall pipeline system so that an annular space between the housings is in communication with an annular space between the inner and outer pipelines of the double wall pipeline system. The compression connecting assembly has a coupler with means to form a compression seal with the outer pipeline and a substantially non-compressible spacer so as to prevent a crushing force from being transmitted to the inner pipeline. The spacer is characterized in having a means of communication between the annular space of the double wall pipeline system and the annular space between the housings.

DETAILED DESCRIPTION OF THE INVENTION

Figure 1:
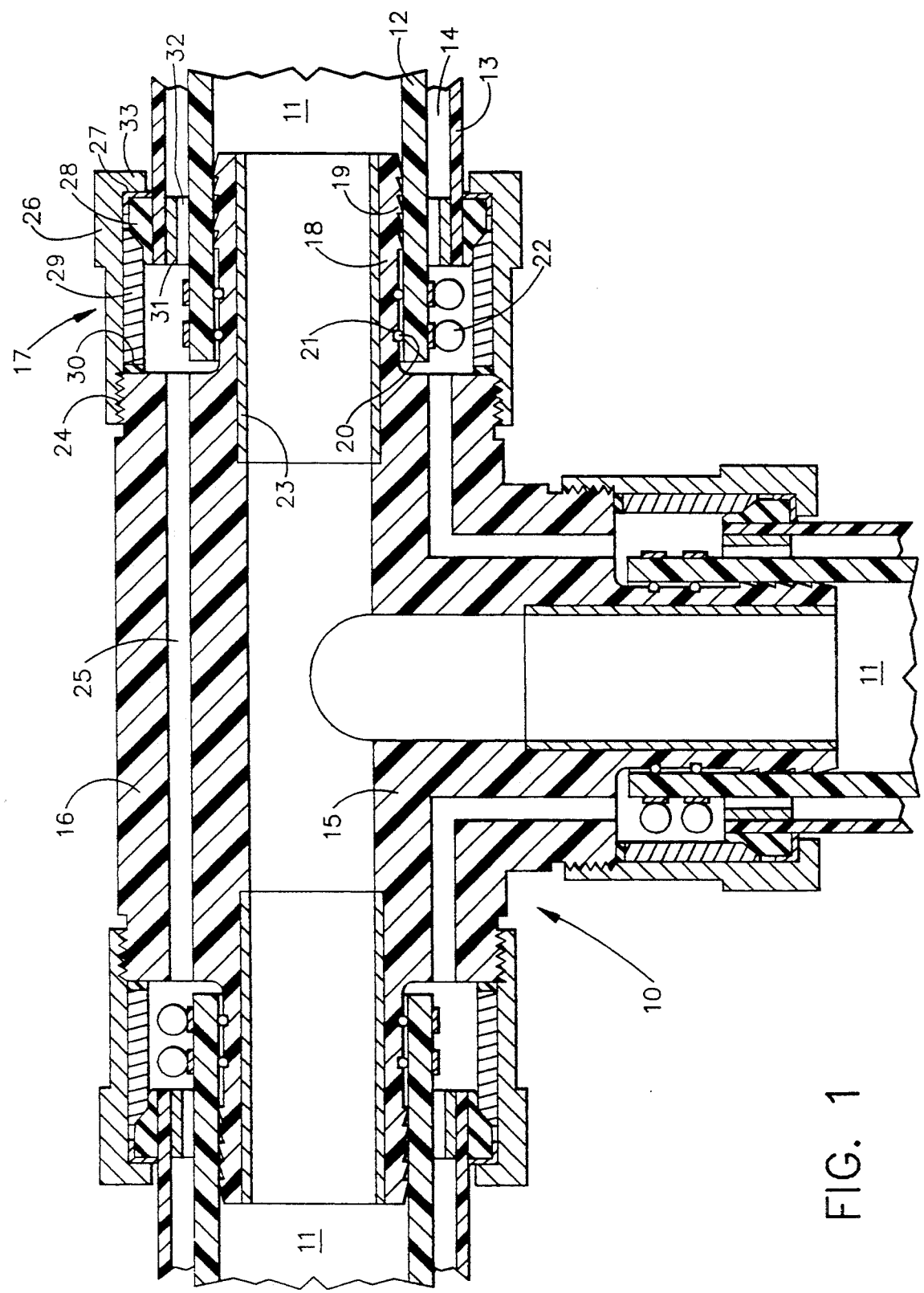
FIG. 1 is a side view in section of a double wall fitting of the invention.

The double wall compression fittings of the invention are useful with double wall pipeline systems. The fitting depicted in FIG. 1 is a T-fitting having three terminals, each connected to a double wall pipeline system. Other fittings such as two terminal straight fittings, i.e. couplers, two terminal elbow fittings and four terminal cross fittings are within the scope of the invention and readily adapted from the disclosure of the T-fittings which follow.

With reference to FIG. 1, there is shown a double wall compression fitting 10 having three terminals. The fitting 10 is used to connect three separate double wall pipeline systems 11. The pipeline systems 11 each have an inner pipeline 12 for conveying a liquid and an outer pipeline 13 encasing the inner pipeline for containing any leaked liquid. An annular space 14 is formed between the pipelines. The double wall pipeline systems 11 are made of an extruded plastic. Other rigid and semi-rigid materials can as well be used to form the pipeline systems. The inner pipeline generally ranges from about one-fourth inch to about six inches in diameter and the outer pipeline slightly larger, though the diameters of the pipelines are not critical and are dictated by the end use.

In accord with this invention, the fitting used for the double wall pipeline systems 11 ensures that the flow paths of liquid in the inner pipeline remains separate when passing through the fitting. Thus, each inner pipeline is connected to the fitting in a sealed manner so that liquid which flows through one inner pipeline will be forced to flow into one or more other inner pipelines. Similarly, a common separate path connects the annular spaces 14 between the three pipelines.

The double wall compression fitting 10 of the invention is comprised of an inner housing 15, an outer housing 16 substantially encasing the inner housing and a compression connecting assembly 17. Each of the components is described in detail below.

The inner housing 15 is preferably a one piece construction. It is shown as made of a rigid plastic. It can as well be made of other materials, including steel or cast iron. The interior of the inner housing forms a flow path connecting the flow of liquid through the inner pipelines of the double wall pipeline systems. Each leg of the inner housing has an externally recessed terminal 18, preferably with a series of ridges 19 extending around its circumference to better engage the inner pipeline and retain it when placed thereover. Preferably, though not necessary, O-rings 20 are positioned on the recessed terminals in O-ring grooves 21 to provide a seal with the inner pipeline. Band clamps 22 are also provided to compress the inner pipeline and O-rings onto the inner housing terminals to ensure a liquid-tight seal. Preferably, also, a metal reinforcing sleeve 23 is inserted in the terminals of the inner housing to keep them from collapsing. Means other than the band clamps can be used to create the liquid-tight seal. For example, the inner pipeline can be forced over the ridges and/or the O-rings of the recessed male terminal a sufficient distance that each ridge/pipeline point of contact provides a degree of seal and collectively provides a liquid-tight seal.

The outer housing 16 substantially encases the inner housing 15. It has the same general shape, though its legs are shorter to allow access to the band clamps for tightening purposes. It is shown as made of a rigid plastic. It can as well be formed from other rigid materials or elastomeric materials. A terminal of each leg of the outer housing 16 has exterior threads 24. An annular space 25 between the housings is formed which is in communication with the annular space 14 between the double wall pipelines through the compression connecting assembly described below.

The compression connecting assembly 17 is used to connect the outer pipelines of the double wall pipeline system 11 to the outer housings of the T-fitting 10 in a sealed fashion while preserving the integrity of the liquid flow path and the annular space flow path. The compression connecting assembly 17 is comprised of an internally threaded coupler nut 26 dimensioned to engage the threads on the terminal of the outer housing 16, a gasket bearing retainer 27, a compression seal 28, a ram compression seat 29, a gasket 30 and a substantially non-compressible spacer 31 with communication means 32 extending through it. The coupler nut 26 has an annular flange 33 extending inwardly at its head. The gasket bearing retainer 27 is a rigid ring with an inside diameter sufficiently large to fit over the outer pipeline 13 and further has a right angle leg which extends from the ring portion. The purpose of the retainer 27 is to receive force from the coupler nut when tightened and transmit it to the compression seal and at the same time confine the compression seal. A secondary benefit realized from the retainer is that it prevents the compression seal from binding against the coupler nut.

The compression seal 28 is a compressible ring which also has an inside diameter sufficient to fit over the outer pipeline and an outer diameter sufficient to be fit within the coupler nut 26 and gasket bearing retainer 27. The compression seal when compressed forms a seal between the outer pipeline and the connecting assembly of the fitting 10.

The ram compression seat 29 is a rigid elongated sleeve which fits within the coupler nut. It has a length sufficient to contact the compression seal and outer housing end edge when the coupler nut 26 is tightened. The ram compression seat 29 and ring gasket 30 seated at the housing's end edge aid in forming a seal between the outer pipeline and outer housing.

Figure 2:
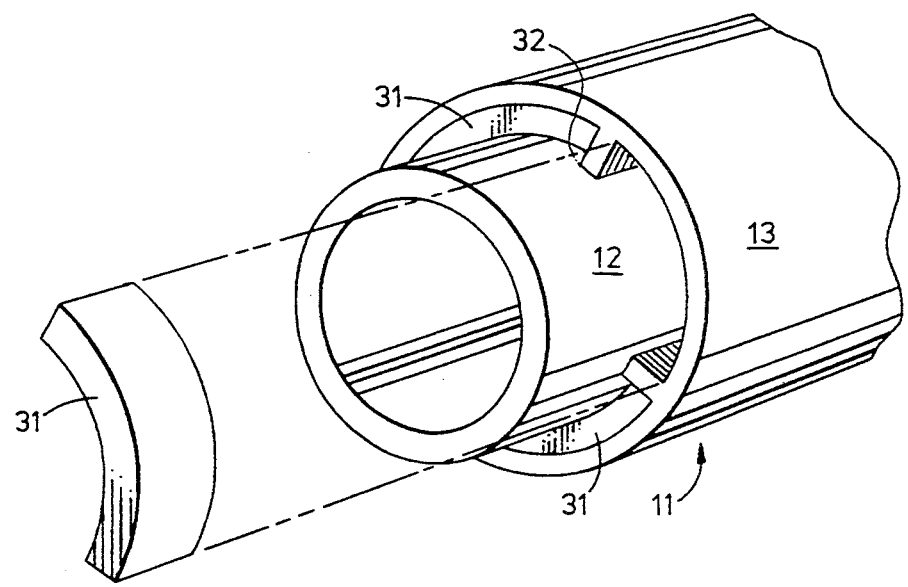
FIG. 2 is a perspective view of a double wall pipeline system with a section of a spacer forming a part of the connecting assembly of FIG. 1 removed therefrom to show its operation.

As best seen in FIG. 2, the substantially non-compressible spacer 31 (shown in sections) is ring-shaped with an inside diameter sufficient to fit over the inner pipeline and an outer diameter sufficient to fit within the inside of the outer pipeline. The spacer is preferably rigid, though some flexing is tolerated provided sufficient rigidity is present to prevent a crushing of the outer pipeline onto the inner pipeline. It can be a rigid annular ring with an outside diameter which fits within the outer pipeline and an inside diameter such that an open space 32 is created to serve as the communication means. That is, the inside diameter of the spacer 31 is greater than the outside diameter of the inner pipeline. The spacer 31 is preferably made in at least three sections, preferably all equal. Three to six substantially equal sections are most preferred for ease of installing and for providing optimum anti-crushing forces.

The non-compressible spacer 31 is positioned between the inner and outer pipelines at their terminals and serves to prevent the pipelines from being crushed by compressive forces imparted by the coupler nut 26 and compression seal 28. It should be understood that crushing of the pipelines could block the communication between the annular spaces and possibly prevent a good seal to the wall of the outer pipeline. Tightening of the outer coupler nut 26 forces the gasket bearing retainer 27, compression seal 28, ram compression seat 29 and gasket 30 together to form a seal to ensure that the annular space between the pipelines is closed to the outside. The spacer 31 ensures that an excessive inward compressing force is not transmitted to the inner pipeline and provides support to the outer pipeline for sealing.

It should be apparent that the fitting 10 is capable of attachment to a double wall pipeline system in a manner wherein the flow path of the inner pipeline remains the same and segregated and the annular space flow path between the pipelines remains the same and segregated. As such, liquid is able to flow through the inner pipeline of a double wall pipeline system, through the inner housing of the fitting and then through one or more inner pipelines of other double wall pipeline systems connected to the fitting. All the while, a continuous annular space is maintained.

Figure 3:
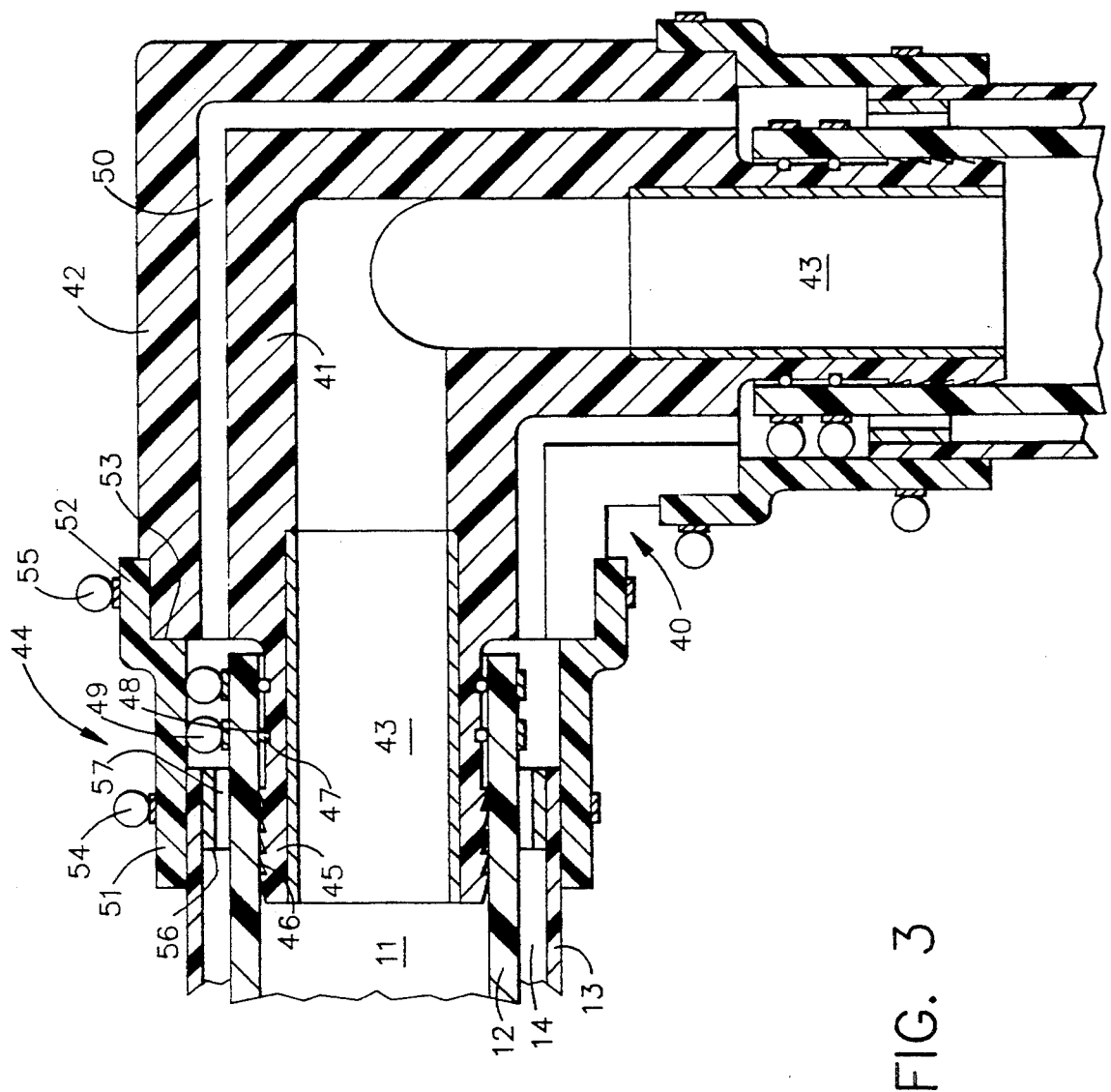
FIG. 3 is a side view in section of an elbow double wall fitting of the invention.

An elbow fitting with another compression connecting assembly is illustrated in FIG. 3. The double wall compression fitting 40 comprises a right angle elbow inner housing 41 with an outer housing 42 encasing it. A metal sleeve 43 is positioned in each terminal of the inner housing 41 to keep the terminals from crushing from the compression connecting assemblies 44 during use. The inner housing has externally recessed male terminals 45 with ridges 46 extending therearound for enhanced pipeline retention. A set of O-rings 47 is optionally positioned in the O-ring grooves 48 on the male terminal 45 to aid in obtaining a liquid-tight seal. Optional band clamps 49 on the inner pipeline 12 terminals provide additional sealing when tightened.

Figure 4:
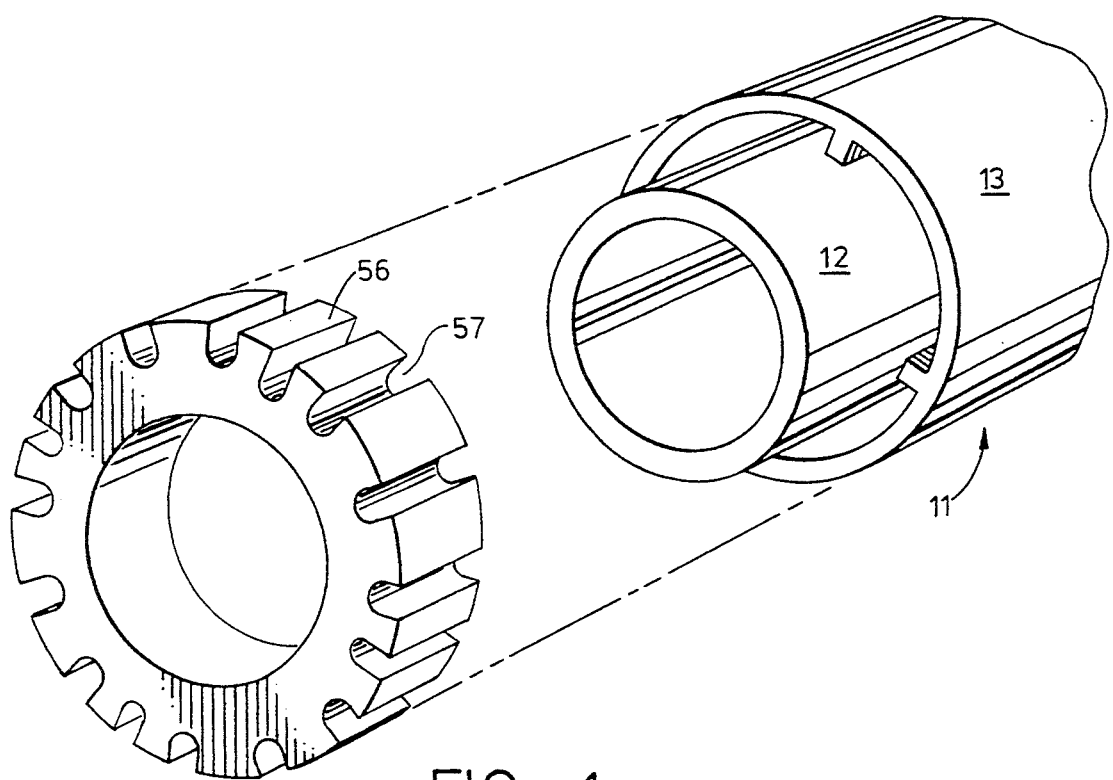
FIG. 4 is a perspective view of a double wall pipeline system with a spacer forming a part of the connecting assembly of FIG. 3 removed therefrom to show its operation.

The compression connecting assembly 44 is comprised of a coupler 51, band clamps 54 and 55 and a substantially non-compressible spacer 56. The coupler 51 has an inside diameter which allows it to fit over the outer pipeline 13 and an annular flange 52 with an inside diameter which allows it to fit over the outer housing 42 of the double wall fitting 40. The inside wall of the flange 52 preferably abuts against the end wall of the outer housing 42. In an alternative embodiment of the invention, the outer housing 42 and the coupler 51 can be molded, formed or machined to be one piece. This eliminates a need for the band clamps 55. When the compression connecting assembly is properly positioned on the outer pipeline 13 and outer housing 42, the band clamps are tightened to form a compression seal between the coupler and the outer pipeline and outer housing. The substantially non-compressible spacer 56 is ring-shaped and dimensioned to fit over the inner pipeline and within the outer pipeline. As best seen in FIG. 4, slots 57 around the periphery of the spacer 56 serve as communication means between the annular space between the pipelines and the annular space between the housings. The number of slots and placement in the spacer are not critical. At least one slot and preferably four to eight slots are used. While the slots can be provided on the outer periphery of the spacer, they can as well be on the inner periphery or interior of the spacer.

The fitting 40 is especially easy to install on a double wall pipeline system. It requires a minimum of components. Its ease of installation and reliability make it attractive when economics dictate a less expensive fitting.

It should be understood that all manners of fittings needed in the single wall piping industry are now available in the double wall piping industry. Most importantly, the separate flow paths provided by the double wall pipelines and their advantages are retained and continued through use of the double wall fittings of this invention.

While the invention has been described with particular reference to the drawings, other variations and obvious modifications of the described system are considered within the scope of the invention. For example, all manners of attachment means can be used to seal the inner pipelines to the inner housings of the fitting including the disclosed O-rings, band clamps and ridges as well as adhesives, threads, etc. Also, all manners of double wall pipelines can as well be used with ready adaptation of the disclosed fittings to the particular pipeline materials of construction and terminal configurations. Additionally, and as disclosed in my U.S. Pat. No. 5,259,651 detection access ports can be built into the fittings for zoned leakage testing. All such obvious modifications are considered within the coverage of the appended claims.

What is claimed is:

1. A double wall compression fitting for attachment to a double wall pipeline system having an inner pipeline with terminals for conveying a liquid and an outer pipeline with terminals for containing liquid with an annular space between the pipelines wherein the fitting is capable of continuing the functions of the inner pipeline and outer pipeline by connecting to the double wall pipeline system in a manner such that a sealed connection is made with the inner pipeline and a sealed connection is made with the outer pipeline and the annular space between the pipelines is in communication with an annular space in the fitting, said double wall compression fitting, comprising:

a) an inner housing having at least two terminals;
 b) an outer housing of the same general shape as the inner housing substantially encasing the inner housing in a manner such that an annular space between the housings is formed, said outer housing having at least two terminals; and
 c) a compression connecting assembly to engage the terminals of the inner pipeline and the terminals of the outer pipeline to the terminals of the inner housing and the terminals of the outer housings, said assembly having:
  i) a coupler with means to compress the coupler to form a seal with the outer pipeline; and
  ii) a substantially non-compressible spacer positioned between the inner and outer pipelines to prevent said pipelines from being crushed by compressive forces imparted by the coupler, further wherein the spacer has a means of communication between the annular space of the double wall pipeline system and the annular space of the housings.

2. The double wall compression fitting of claim 1 wherein the terminals of the inner housing are externally recessed and extend a sufficient distance beyond the terminals of the outer housing to accommodate band clamps around the inner housing terminals to secure the inner pipeline of the double wall pipeline system thereto in a liquid-tight manner.

3. The double wall compression fitting of claim 2 further comprising at least one O-ring positioned on each of the externally recessed terminals of the inner housing to ensure a sealed connection between each said terminal and each of the inner pipelines.

4. The double wall compression fitting of claim 1 wherein a band clamp is used to compress the coupler to the outer pipeline.

5. The double wall compression fitting of claim 1 wherein the outer housing has externally threaded terminals, the coupler is a coupler nut with matching internal threads and further having a compression seal positioned within the coupler nut to make sealing contact with the outer pipeline upon tightening of the coupler nut.

6. The double wall compression fitting of claim 5 wherein the compression seal is a compressible annular ring having an inside diameter sufficient to fit over the outer pipeline and an outside diameter sufficient to fit within the coupler nut whereinupon a compressive force from the coupler nut causes the compression seal to make sealing contact with the outer pipeline.

7. The double wall compression fitting of claim 6 wherein the compression connecting assembly further comprises a gasket bearing retainer positioned within the coupler nut, said gasket bearing retainer being a ring which fits over the outer pipeline and in contact with the compression seal to absorb force from the coupler nut and transmit it to the compression seal.

8. The double wall compression fitting of claim 7 wherein the compression connecting assembly further comprises a ram compression seat and a gasket in contact with the compression seal so that upon tightening of the coupler nut, the compression seal is forced to engage the ram compression seat and gasket to form a seal.

9. The double wall compression fitting of claim 1 wherein the spacer is an annular ring with an outside diameter sufficient to fit within the outer pipeline and an inside diameter greater than the outside diameter of the inner pipeline such that an open space is created to serve as the means of communication between the annular space of the double wall pipeline system and the annular space of the housings.

10. The double wall compression fitting of claim 1 wherein the spacer is ring-shaped with an inside diameter sufficient to fit over the outside of the inner pipeline and an outside diameter sufficient to fit within the outer pipeline and further wherein at least one lateral slot extends therethrough as the means of communication.

11. The double wall compression fitting of claim 1 further wherein the inner housing has a metal sleeve in at least an end to resist crushing when a compressive force is exerted thereon.

12. The double wall compression fitting of claim 11 wherein each end of the metal sleeve has a flared end dimensioned to hold the inner pipeline in a sealed fashion.

13. The double wall compression fitting of claim 1 wherein the spacer has at least three substantially equal sections for ease of installation.

14. A double wall compression fitting for attachment to a double wall pipeline system having an inner pipeline with terminals for conveying a liquid and an outer pipeline with terminals for containing liquid with an annular space between the pipelines wherein the fitting is capable of continuing the functions of the inner pipeline and outer pipeline by connecting to the double wall pipeline system in a manner such that a sealed connection is made with the inner pipeline and a sealed connection is made with the outer pipeline and the annular space between the pipelines is in communication with an annular space in the fitting, said double wall compression fitting, comprising:
   a) an inner housing having at least two terminals, wherein said terminals are externally recessed and extend a sufficient distance beyond the terminals of an outer housing to accommodate band clamps around said inner housing terminals to secure the inner pipeline of the double wall pipeline system thereto;
   b) an outer housing substantially encasing the inner housing in a manner such that an annular space between the housings is formed, said outer housing having at least two terminals; and
   c) a compression connecting assembly to engage the terminals of the inner pipeline and the terminals of the outer pipeline to the terminals of the inner and outer housings, said assembly having:
      i) a coupler with means to compress the coupler to form a seal with the outer pipeline; and
      ii) a substantially non-compressible spacer to make contact with the interior wall of the outer pipeline to prevent said pipeline from being crushed by compressive forces imparted by the coupler, further wherein the spacer has a means of communication between the annular space of the double wall pipeline system and the annular space between the housings.

15. The double wall compression fitting of claim 14 wherein a band clamp is used to compress the coupler to the outer pipeline.

16. The double wall compression fitting of claim 14 wherein the outer housing has externally threaded terminals, the coupler is a coupler nut with matching internal threads and further having a compression seal positioned within the coupler nut to make sealing contact with the outer pipeline upon tightening of the coupler nut.

17. The double wall compression fitting of claim 16 wherein the compression seal is a compressible annular ring having an inside diameter sufficient to fit over the outer pipeline and an outside diameter sufficient to fit within the coupler nut whereinupon a compressive force from the coupler nut causes the compression seal to make sealing contact with the outer pipeline.

18. The double wall compression fitting of claim 17 wherein the compression connecting assembly further comprises a gasket bearing retainer positioned within the coupler nut, said gasket bearing retainer being a ring which fits over the outer pipeline and in contact with the compression seal to absorb force from the coupler nut and transmit it to the compression seal.

19. The double wall compression fitting of claim 18 wherein the compression connecting assembly further comprises a ram compression seat and a gasket in contact with the compression seal so that upon tightening of the coupler nut, the compression seal is forced to engage the ram compression seat and gasket to form a seal.

20. The double wall compression fitting of claim 14 wherein the spacer is an annular ring with an outside diameter sufficient to fit within the outer pipeline and an inside diameter greater than the outside diameter of the inner pipeline.

21. The double wall compression fitting of claim 14 wherein the spacer is ring-shaped and has at least one lateral slot extending therethrough as the means of communication between the annular spaces.

* * * * *